United States Patent [19]

Le-Khac

[11] Patent Number: 5,527,880
[45] Date of Patent: *Jun. 18, 1996

[54] POLYURETHANE FOAM-SUPPORTED DOUBLE METAL CYANIDE CATALYSTS FOR POLYETHER POLYOL SYNTHESIS

[75] Inventor: Bi Le-Khac, West Chester, Pa.

[73] Assignee: ARCO Chemical Technology, I.P., Greenville, Del.

[ * ] Notice: The term of this patent shall not extend beyond the expiration date of Pat. No. 5,523,386.

[21] Appl. No.: 453,654

[22] Filed: May 30, 1995

Related U.S. Application Data

[60] Division of Ser. No. 345,644, Dec. 1, 1994, Pat. No. 5,498,583, which is a continuation-in-part of Ser. No. 173,290, Dec. 23, 1993, Pat. No. 5,426,081.

[51] Int. Cl.$^6$ ............................................. C08G 65/10
[52] U.S. Cl. .......................... 528/415; 502/159; 528/405; 528/412
[58] Field of Search .................... 502/154, 159; 528/415, 412, 405

[56] References Cited

U.S. PATENT DOCUMENTS

| | | | |
|---|---|---|---|
| 3,278,457 | 10/1966 | Milgrom | 260/2 |
| 3,278,458 | 10/1966 | Belner | 260/2 |
| 3,404,109 | 10/1968 | Milgrom | 260/611 |
| 3,427,256 | 2/1969 | Milgrom | 252/431 |
| 3,427,334 | 2/1969 | Herold | 260/429 |
| 3,427,335 | 2/1969 | Herold | 260/429 |
| 3,538,043 | 11/1970 | Herold | 260/40 |
| 3,900,518 | 8/1975 | Milgrom | 260/573 |
| 3,941,849 | 3/1976 | Herold | 260/607 |
| 4,355,188 | 10/1982 | Herold et al. | 568/620 |
| 4,472,560 | 9/1984 | Kuyper et al. | 526/120 |
| 4,477,589 | 10/1984 | van der Hulst et al. | 502/169 |
| 4,721,818 | 1/1988 | Harper et al. | 568/120 |
| 4,843,054 | 6/1989 | Harper | 502/175 |
| 4,877,906 | 10/1989 | Harper | 568/621 |
| 4,987,271 | 1/1991 | Watabe et al. | 568/621 |
| 5,010,047 | 4/1991 | Schuchardt | 502/24 |
| 5,099,075 | 3/1992 | Katz et al. | 568/621 |
| 5,144,093 | 9/1992 | Reisch et al. | 568/621 |
| 5,145,883 | 9/1992 | Saito et al. | 521/172 |
| 5,158,922 | 10/1992 | Hinney et al. | 502/175 |
| 5,223,583 | 6/1993 | Higuchi et al. | 525/404 |

FOREIGN PATENT DOCUMENTS 6-248068  9/1994  Japan .

OTHER PUBLICATIONS

J. L. Schuchardt et al., SPI Proceedings, 32nd Annual Polyurethane Tech./Market. Conf. (1989) 360.

*Primary Examiner*—Robert E. Sellers
*Attorney, Agent, or Firm*—Jonathan L. Schuchardt

[57] ABSTRACT

Polyurethane foam-supported double metal cyanide (DMC) catalysts are disclosed as useful catalysts for epoxide polymerization. The foam-supported catalysts are easy to prepare, and are more active and show reduced induction periods compared with conventional powdered DMC catalysts. The catalysts of the invention can be recovered from the epoxide polymer products and can be reused to catalyze additional epoxide polymerizations.

5 Claims, No Drawings

POLYURETHANE FOAM-SUPPORTED DOUBLE METAL CYANIDE CATALYSTS FOR POLYETHER POLYOL SYNTHESIS

CROSS REFERENCE TO RELATED APPLICATION

This is a division of application Ser. No. 08/345,644, filed Dec. 1, 1994, now U.S. Pat. No. 5,498,583, which is a continuation-in-part of application Ser. No. 08/173,290 filed Dec. 23, 1993, now U.S. Pat. No. 5,426,081.

FIELD OF THE INVENTION

The invention relates to catalysts useful for epoxide polymerization. In particular, the invention relates to double metal cyanide (DMC) catalysts that are supported on a polyurethane foam. The foam-supported catalysts are especially useful for preparing polyether polyols having low unsaturation.

BACKGROUND OF THE INVENTION

Double metal cyanide (DMC) compounds are well known catalysts for epoxide polymerization. The catalysts are highly active, and give polyether polyols that have low unsaturation compared with similar polyols made using conventional base catalysis. Conventional DMC catalysts are prepared by reacting aqueous solutions of metal salts and metal cyanide salts to form a precipitate of the DMC compound. The catalysts can be used to make a variety of polymer products including polyether, polyester, and polyetherester polyols. Many of the polyols are useful in various polyurethane coatings, elastomers, sealants, foams, and adhesives.

Conventional double metal cyanide catalysts are usually prepared in the presence of a low molecular weight organic complexing agent such as glyme. The ether complexes with the DMC compound, and favorably impacts the activity of the catalyst for epoxide polymerization. In one conventional preparation, aqueous solutions of zinc chloride (excess) and potassium hexacyanocobaltate are combined. The resulting precipitate of zinc hexacyanocobaltate is combined with aqueous glyme (dimethoxyethane). An active catalyst is obtained that has the formula:

$$Zn_3[Co(CN)_6]_2 \cdot xZnCl_2 \cdot yH_2O \cdot zGlyme.$$

One drawback of conventional DMC catalysts is that they become finely dispersed or practically soluble in polyether polyol mixtures during epoxide polymerizations. Removal of the catalyst from the polyol following polymerization is desirable because the catalyst residues promote an undesirable accumulation of volatile materials (such as propionaldehyde) in the polyol during storage. Unfortunately, DMC catalyst residues are often difficult to remove completely from the polyols, and common catalyst removal techniques usually deactivate DMC catalysts.

Double metal cyanide catalysts usually have good activity for epoxide polymerizations. However, because the catalysts are rather expensive, catalysts with improved activity are desirable because reduced catalyst levels could be used.

Finally, DMC catalysts normally require an "induction" period. In contrast to basic catalysts, DMC catalysts ordinarily will not begin polymerizing epoxides immediately following exposure of epoxide and starter polyol to the catalyst. Instead, the catalyst needs to be activated with a small proportion of epoxide before it becomes safe to begin continuously adding the remaining epoxide. Induction periods of an hour or more are typical yet costly in terms of increased cycle time in a polyol production facility. Reduction or elimination of the induction period is desirable.

Improved DMC catalysts are needed. Catalysts having higher activity are desirable for improving productivity and reducing process cost. Double metal cyanide catalysts with shorter induction periods in epoxide polymerizations would permit a safer, more productive process. Preferred catalysts could be isolated from the polyether polyol product following synthesis and be reused for additional polymerizations.

SUMMARY OF THE INVENTION

The invention is an epoxide polymerization catalyst. The catalyst comprises a double metal cyanide (DMC) catalyst supported on a polyurethane foam. Surprisingly, the DMC catalyst remains active toward epoxide polymerization even after formulation into a polyurethane foam. In fact, the polyurethane foam-supported catalysts of the invention have superior activities and show reduced induction periods compared with conventional powdered DMC catalysts.

The invention includes a process for making the polyurethane foam-supported catalyst. The process comprises preparing a polyurethane foam from a polyol, a polyisocyanate, water, a surfactant, a foaming catalyst, and a DMC catalyst. The foam is easily prepared according to methods already well known in the art, except that a DMC catalyst is included in the foam formulation. The resulting polyurethane foam, which contains a supported DMC catalyst, is useful as an epoxide polymerization catalyst.

The invention also includes a process for making a polyether polyol. This process comprises polymerizing an epoxide in the presence of the polyurethane foam-supported DMC catalyst. Polyether polyols made with the catalysts of the invention contain unusually low levels of low molecular weight polyol impurities.

The foam-supported catalysts of the invention are easily prepared and have superior activity for epoxide polymerizations. In addition, the foam-supported catalyst of the invention can be isolated from the polyether polyol product following polyol synthesis, and can be reused as a catalyst for another epoxide polymerization.

DETAILED DESCRIPTION OF THE INVENTION

The catalyst of the invention comprises a double metal cyanide (DMC) catalyst supported on a polyurethane foam. As defined in this application, a "double metal cyanide catalyst" or "DMC catalyst" is any DMC compound or complex that will actively polymerize an epoxide when used without a catalyst support, i.e., in powder form. Specifically included, and described in more detail below, are: (1) conventional DMC catalysts, (2) substantially amorphous DMC complexes and compounds, (3) solid DMC catalysts that include a polyether as part of the DMC catalyst, and (4) crystalline DMC complexes prepared using only a slight excess of metal halide salt.

Conventional DMC catalysts suitable for use are well known in the art. The preparation of conventional DMC catalysts is fully described in many references, including U.S. Pat. Nos. 5,158,922, 4,843,054, 4,477,589, 3,427,335, 3,427,334, 3,427,256, 3,278,457, and 3,941,849. The teachings of these references related to catalyst preparation and suitable DMC compounds are incorporated herein by reference. Example 1 below shows the preparation of a foam-supported DMC catalyst of the invention from a conventional DMC catalyst.

Generally, DMC catalysts are the reaction products of a water-soluble metal salt and a water-soluble metal cyanide salt. The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Examples of suitable metal salts include, but are not limited to, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel(II) nitrate; and the like, and mixtures thereof.

The water-soluble metal cyanide salts used to make the DMC catalysts useful in the invention preferably have the general formula $(Y)_a M'(CN)_b (A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, but are not limited to, potassium hexacyanocobaltate(III), potassium hexacyanoferrate(II), potassium hexacyanoferrate(III), calcium hexacyanocobaltate(III), lithium hexacyanoiridate(III), and the like.

The water-soluble metal salt and the water-soluble metal cyanide salt are combined in aqueous media according to methods well known in the art to produce a water-insoluble precipitate of a DMC compound. For example, when aqueous solutions of zinc chloride and potassium hexacyanocobaltate are combined at room temperature, an insoluble precipitate of zinc hexacyanocobaltate immediately forms. Usually, an excess amount of the water-soluble metal salt is used compared with the amount of water-soluble metal cyanide salt because doing so gives a catalyst with high polymerization activity.

Examples of DMC catalysts that can be supported on polyurethane foam to make the compositions of the invention include, for example, zinc hexacyanocobaltate(III), zinc hexacyanoferrate(III), zinc hexacyanoferrate(II), nickel(II) hexacyanoferrate(II), cobalt(II) hexacyanocobaltate(III), and the like. Further examples of suitable DMC catalysts are listed in U.S. Pat. No. 5,158,922, the teachings of which are incorporated herein by reference. Zinc hexacyanocobaltate(III) is preferred.

Double metal cyanide compounds are normally further activated by combining them, either during preparation or following precipitation of the catalyst, with an excess amount of an organic complexing agent, i.e., a water-soluble heteroatom-containing organic liquid compound that can complex with the DMC compound, as fully described in U.S. Pat. No. 5,158,922. Suitable organic complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Most preferred is tert-butyl alcohol.

In addition to the conventional DMC catalysts described above, suitable DMC catalysts useful in making the polyurethane foam-supported DMC catalysts of the invention include the newer types of DMC catalysts described below.

Recently, I discovered a new type of DMC catalyst with improved activity for polymerizing epoxides, and these catalysts can also be supported on a polyurethane foam as described in this application. Unlike conventional DMC catalysts, these contain a major proportion of a substantially amorphous DMC complex. Preferably, the DMC catalyst comprises at least about 70 wt. % of a substantially amorphous DMC complex. More preferred DMC catalysts comprise at least about 90 wt. % of a substantially amorphous DMC complex; most preferred catalysts comprise at least about 99 wt. % of a substantially amorphous DMC complex.

As defined in this application, "substantially amorphous" means substantially noncrystalline, lacking a well-defined crystal structure, or characterized by the substantial absence of sharp lines in the powder X-ray diffraction pattern of the composition.

Powder X-ray diffraction (XRD) patterns of conventional double metal cyanide catalysts show characteristic sharp lines that correspond to the presence of a substantial proportion of a highly crystalline DMC component. Highly crystalline zinc hexacyanocobaltate prepared in the absence of an organic complexing agent, which does not actively polymerize epoxides, shows a characteristic XRD fingerprint of sharp lines at d-spacings of about 5.07, 3.59, 2.54, and 2.28 angstroms.

When a DMC catalyst is made in the presence of an organic complexing agent according to conventional methods, the XRD pattern shows lines for the highly crystalline material in addition to broader signals from relatively amorphous material, suggesting that conventional DMC catalysts used for epoxide polymerization are actually mixtures of highly crystalline DMC compound and a more amorphous component. Typically, conventional DMC catalysts, which are generally prepared by simple mixing, contain at least about 35 wt. % of highly crystalline DMC compound.

When a substantially amorphous zinc hexacyanocobaltate catalyst of the invention is prepared using tert-butyl alcohol as a complexing agent, for example, the powder X-ray diffraction pattern shows essentially no lines for crystalline zinc hexacyanocobaltate (5.07, 3,59, 2.54, 2.28 angstroms), but instead has only two major lines, both relatively broad, at d-spacings of about 4.82 and 3.76 angstroms. This DMC catalyst contains less than about 1 wt. % of highly crystalline DMC compound by X-ray analysis.

Substantially amorphous DMC catalysts useful in making the polyurethane foam-supported catalysts of the invention can be made as follows. Aqueous solutions of a water-soluble metal salt and a water-soluble metal cyanide salt are intimately combined and reacted in the presence of a complexing agent to produce an aqueous mixture that contains a precipitated DMC complex catalyst. Next, the catalyst is isolated and is preferably dried. The complexing agent can be included with either or both of the aqueous salt solutions, or it can be added to the DMC compound immediately following precipitation of the catalyst. It is preferred to pre-mix the complexing agent with either the water-soluble metal salt, or with the water-soluble metal cyanide salt, or both, before intimately combining the reactants. The resulting catalyst composition is substantially amorphous, as is evidenced by the substantial absence of highly crystalline DMC compound by powder X-ray diffraction analysis.

Achieving an intimate combination of the reactants is essential to preparing catalysts having low crystallinity. In conventional methods, the water-soluble metal salt and the water-soluble metal cyanide salt are combined in aqueous media and are simply mixed together, typically with magnetic or mechanical stirring. This method of preparation normally results in catalysts having a substantial amount of highly crystalline DMC component, typically greater than about 35 wt. %. I found that combining the reactants in a manner effective to achieve an intimate combination of the reactants results in substantially amorphous catalysts that are exceptionally useful for epoxide polymerization. Suitable methods of achieving this intimate combination of reactants include homogenization, impingement mixing, high-shear stirring, and the like. When the reactants are homogenized, for example, the level of highly crystalline material in the catalyst composition is minimized or eliminated, and is much lower than the amount of crystalline material present in a catalyst made by simple mixing. Example 11 below illustrates the preparation of a substantially amorphous DMC catalyst and its use to make a foam-supported catalyst of the invention.

Another non-conventional type of DMC catalyst useful in making the foam-supported catalysts of the invention is a DMC catalyst that includes a polyether. This DMC catalyst comprises a DMC compound, an organic complexing agent, and from about 5 to about 80 wt. % of a polyether. The polyether preferably has a number average molecular weight greater than 500, and is preferably not miscible with water. Suitable DMC compounds and organic complexing agents are described above.

Preferred catalysts include from about 10 to about 70 wt. % of the polyether; most preferred catalysts include from about 15 to about 60 wt. % of the polyether. At least about 5 wt. % of the polyether is needed to significantly improve the catalyst activity compared to a catalyst made in the absence of the polyether. Catalysts that contain more than about 80 wt. % of the polyether are generally no more active, and they are impractical to isolate and use because they are typically sticky pastes rather than powdery solids.

Suitable polyethers for making the polyether-containing DMC catalysts of the invention include those produced by ring-opening polymerization of cyclic ethers, and include epoxide polymers, oxetane polymers, tetrahydrofuran polymers, and the like. Any method of catalysis can be used to make the polyethers. The polyethers can have any desired end groups, including, for example, hydroxyl, amine, ester, ether, or the like. Preferred polyethers are not miscible with water. Preferred polyethers are polyether polyols having average hydroxyl functionalities from about 2 to about 8 and number average molecular weights within the range of about 1000 to about 10,000, more preferably from about 1000 to about 5000. These are usually made by polymerizing epoxides in the presence of active hydrogen-containing initiators and basic, acidic, or organometallic catalysts (including DMC catalysts). Useful polyether polyols include poly(oxypropylene) polyols, EO-capped poly(oxypropylene) polyols, mixed EO-PO polyols, butylene oxide polymers, butylene oxide copolymers with ethylene oxide and/or propylene oxide, polytetramethylene ether glycols, and the like. Most preferred are poly(oxypropylene) polyols, particularly diols and triols having number average molecular weights within the range of about 2000 to about 4000.

Example 12 below illustrates the preparation of a powdered DMC catalyst that includes a polyether polyol in the catalyst. Like the DMC catalyst prepared in Example 11, this catalyst is substantially amorphous by powder X-ray diffraction analysis. Example 12 also shows how to make a foam-supported catalyst of the invention from the polyether-containing DMC catalyst.

Double metal cyanide catalysts useful in the invention include certain crystalline forms of DMC complexes. These complexes are prepared using only a slight excess of metal halide salt so that the catalyst appears substantially crystalline by powder X-ray diffraction analysis, but also has good activity for epoxide polymerization. Another way to make the crystalline yet active catalysts is to use more than a slight excess of the metal halide salt, and then wash the catalyst well during preparation in a manner effective to leave behind in the DMC catalyst only a slight excess of the metal halide salt.

When a zinc hexacyanocobaltate catalyst is prepared, for example, from zinc chloride and potassium hexacyanocobaltate, the Zn/Co mole ratio in the product is exactly 1.50 if no excess of zinc chloride is present. A catalyst with no excess metal halide salt is not active as an epoxide polymerization catalyst. A crystalline, yet active DMC catalyst results when a slight excess of the metal halide salt is present, and the Zn/Co mole ratio in the product is within the range of about 1.5 to about 1.8. When this ratio exceeds about 1.8, powder X-ray diffraction analysis shows a more amorphous-like catalyst, i.e., one that lacks sharp lines in the X-ray pattern. Example 13 below illustrates the preparation of a crystalline DMC catalyst made with a slight excess of water-soluble metal salt (zinc chloride), and use of the DMC catalyst to make a foam-supported catalyst of the invention.

Any of the DMC catalysts described above is supported on a polyurethane foam to produce a "foam-supported" catalyst of the invention. Generally, this is accomplished by combining the DMC catalyst with other reactants used in an ordinary polyurethane foam formulation. Preferred foams are those which are simple and inexpensive to prepare. Methods for making polyurethane foams are described, for example, in U.S. Pat. Nos. 4,910,231 and 5,177,119, the teachings of which are incorporated herein by reference.

The invention includes a simple process for making the foam-supported catalysts of the invention. The process comprises preparing a polyurethane foam from a polyol, a polyisocyanate, water, a surfactant, a foaming catalyst, and a DMC catalyst. Preferably, both an amine catalyst and an organometallic catalyst such as an organotin compound are included as foaming catalysts in the formulation. Any known process for making polyurethane foams can be used, including the one-shot and the prepolymer methods so well known to those skilled in the art of polyurethane foam manufacture. It is convenient to just slurry the DMC catalyst with the polyol ("B-side") components, and to combine the A-side and B-side reactants in a one-shot foaming process. Surprisingly, the normally sensitive foaming process is not adversely affected by the presence of a substantial amount of DMC catalyst. Also surprisingly, the DMC catalyst remains active toward epoxide polymerization.

When a powdered DMC catalyst is formulated into a polyurethane foam as described above, the resulting foam-supported catalyst typically exhibits a reduced induction period in epoxide polymerizations compared with the unsupported, powdered catalyst.

In one embodiment of the invention, an activated catalyst that requires no induction period is made. In this process, a DMC catalyst is combined with an epoxide and a hydroxyl group-containing starter at a temperature and for a time effective to initiate polymerization of the epoxide, but the DMC catalyst is isolated from the starter and any unreacted epoxide as soon as catalyst activation has occurred. The isolated, activated DMC catalyst is then formulated into a polyurethane foam with a polyisocyanate, water, and polyol(s) in the presence of a surfactant and a foaming catalyst.

In a second embodiment for making an activated catalyst, a DMC catalyst is combined with an epoxide and a hydroxyl group-containing starter at a temperature and for a time effective to initiate polymerization of the epoxide and produce an activated DMC catalyst/starter mixture. A polyurethane foam is then prepared by reacting a polyisocyanate, water, the activated DMC catalyst/starter mixture, and optional polyol(s) in the presence of a surfactant and a foaming catalyst. The resulting product is an activated, polyurethane foam-supported DMC catalyst that can be used to polymerize epoxides without an induction period.

The main advantage of the first embodiment is that it allows the manufacturer to choose a hydroxyl group-containing starter that rapidly gives an activated catalyst (1-octanol, for example), while different polyols that are more useful for foam formulation can be used to make the foam. An advantage of the second embodiment is that catalyst activation and foam formulation are performed without including a step to isolate the activated catalyst from the starter.

Generally, the hydroxyl group-containing starter can have from 1 to 8 hydroxyl groups, and can be any desired molecular weight. Any desired amount of epoxide can be reacted with the starter, provided that catalyst activation has been achieved. Catalyst activation is typically verified by an accelerated drop in reactor pressure following combination of the epoxide and hydroxyl group-containing starter (see Examples 2–4).

Although any desired amount of DMC catalyst can be used to make the foam-supported catalysts of the invention, it is generally preferred to include an amount of DMC catalyst within the range of about 1 to about 20 weight percent based on the amount of foam-supported catalyst produced. A more preferred range is from about 5 to about 15 weight percent.

After the foam is prepared, it is preferably vacuum dried to remove moisture and other volatile impurities. I surprisingly found that catalyst activity improves when a vacuum drying step is included in the catalyst preparation. The vacuum drying is preferably performed at a temperature within the range of about 20° C. to about 90° C., more preferably from about 30° C. to about 60° C., at a vacuum of less than about 100 mm Hg.

The invention includes a process for making a polyether polyol. This process comprises polymerizing an epoxide in the presence of the polyurethane foam-supported DMC catalyst of the invention. Preferred epoxides are ethylene oxide, propylene oxide, butene oxides, styrene oxide, and the like, and mixtures thereof. The process can be used to make random or block copolymers from the epoxides in the same manner as is used to make epoxide copolymers with unsupported DMC catalysts.

Other monomers that will copolymerize with an epoxide in the presence of a DMC catalyst can be included in the process of the invention to make modified polyether polyols. Any of the copolymers known in the art made using unsupported DMC catalysts can be made with the foam-supported catalysts of the invention. For example, epoxides copolymerize with oxetanes (as taught in U.S. Pat. Nos. 3,278,457 and 3,404,109) to give polyethers, or with anhydrides (as taught in U.S. Pat. Nos. 5,145,883 and 3,538,043) to give polyester or polyetherester polyols. The preparation of polyether, polyester, and polyetherester polyols using DMC catalysts is fully described, for example, in U.S. Pat. Nos. 5,223,583, 5,145,883, 4,472,560, 3,941,849, 3,900,518, 3,538,043, 3,404,109, 3,278,458, 3,278,457, and in J. L. Schuchardt and S. D. Harper, *SPI Proceedings,32nd Annual Polyurethane Tech./Mark. Conf.* (1989) 360. The teachings of these references related to polyol synthesis using DMC catalysis are incorporated herein by reference in their entirety.

A solvent is optionally included in making polyether polyols by the process of the invention. Suitable solvents are those in which the epoxide and hydroxyl group-containing starter are soluble, and which do not deactivate the double metal cyanide catalyst. Preferred solvents include aliphatic and aromatic hydrocarbons, ethers, ketones, and esters. A solvent is not usually necessary, however, and it is often preferred for economic reasons to make the polyethers in the absence of a solvent.

A key advantage of the foam-supported catalysts of the invention is that they have high activity compared with unsupported powdered catalysts. Polymerization rates two or more times greater than the normal rate of polymerization with the same concentration of DMC compound are typical. A consequence of higher polymerization rates is that polyol producers can reduce the amount of relatively expensive DMC catalyst used in the process and save money. More active catalysts also permit the producer to reduce batch times and increase productivity.

Another advantage of the foam-supported catalysts of the invention for making polyether polyols is that they show a reduced induction period. Conventional unsupported DMC catalysts are not immediately active toward epoxide polymerization. Typically, a starter polyol, the catalyst, and a small amount of epoxide are combined and heated to the desired reaction temperature, and no epoxide polymerizes immediately. The polyol manufacturer must wait (usually for one to several hours) until the catalyst becomes active and the charged epoxide begins to react before additional epoxide can safely be continuously added to the polymerization reactor. The foam-supported catalysts are more rapidly activated than conventional powdered catalysts. This feature of the catalysts is an economic advantage because delays in adding the epoxide are reduced. The induction period can be eliminated by using an activated polyurethane foam-supported catalyst prepared as described earlier.

Another advantage of the foam-supported catalysts of the invention is that they can be isolated from the polyether polyol products by filtration, and can be reused to catalyze additional epoxide polymerizations. This is illustrated by Example 10 below. Most catalyst removal methods for DMC catalysts irreversibly deactivate the catalyst (see, for example, U.S. Pat. Nos. 5,144,093, 5,099,075, 4,987,271, 4,877,906, 4,721,818, and 4,355,188), so that reuse of the catalyst is not possible. The methods described in U.S. Pat. No. 5,010,047 can also be used to recover the supported catalysts of the invention from polyols.

The foam-supported catalysts of the invention can be used in a batch, continuous, or semi-continuous process. The foam can be used "as is," or it can be cut up, pulverized, or ground into small pieces prior to use as a catalyst. Preferably, the foam is reticulated, i.e., the foam is subjected to conditions that are effective to open a substantial proportion of the cells. One method of making a reticulated foam is to crush the foam soon after preparation to maximize the number of open cells in the foam, and to permit maximum air flow through the foam. The reticulated foam can then be used "as is" or it can be cut up. A cut up or pulverized foam is well-suited for use in a batch-type process.

A fixed-bed catalyst system suitable for a continuous process is conveniently made by foaming the DMC catalyst-containing polyurethane mixture in place in a column. Epoxide and starter polyol can then be passed through the column at the desired reaction temperature under conditions effective to produce a polymer product that has the desired molecular weight.

Polyether polyols made with the foam-supported catalysts of the invention contain an unusually low level of low molecular weight polyol impurities. When a conventional powdered catalyst is used (glyme complexing agent), the polyol product typically contains up to about 5–10 weight percent of a low molecular weight polyol impurity, as is evident from gel-permeation chromatography analysis of the product. Surprisingly, polyols made from a foam-supported catalyst of the invention (in which glyme is used to make the powdered catalyst) do not contain detectable levels of low molecular weight polyol impurities.

The following examples merely illustrate the invention. Those skilled in the art will recognize many variations that are within the spirit of the invention and scope of the claims.

EXAMPLE 1

Preparation of Polyurethane Foam-Supported Zinc Hexacyanocobaltate

A flexible, polyurethane foam is prepared according to the one-shot method. ARCOL 3520 polyol (3500 molecular weight, all-PO triol, product of ARCO Chemical Company, 56.8 g) is blended with water (2.28 g), L-6202 surfactant (0.5 g, product of Dow Corning), A-1 amine catalyst (0.1 g, product of Air Products), A-33 catalyst (0.02 g, product of Air Products), T-12 catalyst (0.5 g, product of Air Products), and zinc hexacyanocobaltate powdered catalyst (10.0 g, prepared as described in U.S. Pat. No. 5,158,922 using glyme as a complexing agent). Toluene diisocyanate (80:20 mixture of 2,4- and 2,6- isomers, 29.8 g, 110 NCO index) is added in one portion to the B-side components, and the mixture is rapidly blended at room temperature. The mixture is poured into a box, where it rises and cures to form a cured polyurethane foam. The foam is cured at 110° C. for 30 min., and is cut into small pieces. The cut-up foam is dried in a vacuum oven at 50° C. for 90 min. to remove volatile materials. This dried, foam-supported catalyst is identified as Catalyst A.

Additional foam-supported catalyst is prepared as described above, but the vacuum drying step at 50° C. is omitted. This "non-dried" catalyst is designated as Catalyst B.

EXAMPLES 2–4

Preparation of a Polyether Polyol using Foam-Supported Zinc Hexacyanocobaltate (Catalyst A: Dried Catalyst)

A one-liter stainless-steel stirred reactor is charged with poly(oxypropylene) triol (700 mol. wt.) starter (50 g) and polyurethane foam-supported zinc hexacyano-cobaltate catalyst (0.5–1 g, as prepared in Example 1, 110–222 ppm level in the finished polyol product). The mixture is stirred and stripped under vacuum to remove traces of water from the triol starter. Heptane (130 g) is added to the reactor, and the mixture is heated to 105° C. The reactor is pressurized to about 2 psi with nitrogen. Propylene oxide (15–20 g) is added to the reactor in one portion, and the reactor pressure is monitored carefully. Additional propylene oxide is not added until an accelerated pressure drop occurs in the reactor; the pressure drop is evidence that the catalyst has become activated. When catalyst activation is verified, the remaining propylene oxide (380–385 g) is added gradually over about 1–3 h at 105° C. at a constant pressure of about 25 psi. After propylene oxide addition is complete, the mixture is held at 105° C. until a constant pressure is observed. Residual unreacted monomer is then stripped under vacuum from the polyol product, and the polyol is cooled and recovered. The polymerization rates and induction periods observed for various catalyst concentrations of these dried, foam-supported catalysts appear in Table 1.

COMPARATIVE EXAMPLES 5–7

Preparation of a Polyether Polyol using Powdered Zinc Hexacyanocobaltate

The procedure of Examples 2–4 is repeated, except that the catalyst used is an unsupported, powdered zinc hexacyanocobaltate catalyst prepared by the method of U.S. Pat. No. 5,158,922 using glyme as a complexing agent. The catalyst is used at a 100–250 ppm level. The polymerization rates and induction periods observed at various catalyst concentrations of these powdered catalysts appear in Table 1.

The results of Examples 2–4 and Comparative Examples 5–7 show that the foam-supported zinc hexacyanocobaltate catalyst is more active and exhibits a shorter induction time than the powdered catalyst when each is used at about the same zinc hexacyanocobaltate concentration. For example, the foam-supported catalyst at only 110 ppm has comparable activity (3.4 g/min) and induction time (175 min) to the powdered catalyst at 250 ppm (activity=3.5 g/min, induction time=180 min).

TABLE 1

Polyol Synthesis with Foam-Supported and Powdered Zinc Hexacyanocobaltate Catalysts: Catalyst Activity and Induction Period

| Ex # | Catalyst type | Catalyst level (ppm) | Polymerization rate (g/min) | Induction Period (min) |
|---|---|---|---|---|
| 2 | Foam-supported | 110 | 3.4 | 175 |
| 3 | | 167 | 5.7 | 165 |
| 4 | | 222 | 8.0 | 145 |
| C5 | Powdered | 100 | 1.46 | 230 |
| C6 | | 130 | 1.78 | 175 |
| C7 | | 250 | 3.50 | 180 |

EXAMPLES 8–9

Preparation of a Polyether Polyol using Foam-Supported Zinc Hexacyanocobaltate: Effect of Moisture on Catalyst Activity and Induction Period (Foam-Supported Catalysts)

The procedure of Examples 2–4 is followed with 2 g of foam-supported catalyst. In Example 8, the dried, foam-supported catalyst (Catalyst A) is used. Example 9 uses a foam-supported catalyst prepared without a vacuum drying step (Catalyst B).

When Catalyst A (dried) is used, the rate of propylene oxide polymerization is 13.3 g/min, and the induction period is 140 min. With Catalyst B (non-dried), the rate is 7.3 g/min, and the induction period is 160 min.

The results show that vacuum drying following preparation improves the foam-supported zinc hexacyanocobaltate catalyst.

EXAMPLE 10

Recovery and Reuse of Foam-Supported Zinc Hexacyanocobaltate Catalyst

A one-liter stainless-steel stirred reactor is charged with poly(oxypropylene) triol (700 mol. wt.) starter (50 g) and polyurethane foam-supported zinc hexacyano-cobaltate catalyst (Catalyst B, 4 g, as prepared in Example 1, 700 ppm level in the finished polyol product). The mixture is stirred and stripped under vacuum to remove traces of water from the triol starter. Heptane (130 g) is added to the reactor, and the mixture is heated to 105° C. The reactor is pressurized to about 6 psi with nitrogen. Propylene oxide (11 g) is added to the reactor in one portion, and the reactor pressure is monitored carefully. Additional propylene oxide is not added until an accelerated pressure drop occurs in the reactor; the pressure drop is evidence that the catalyst has become activated. When catalyst activation is verified, the remaining propylene oxide (389 g) is added gradually over about 1–3 h at 105° C. at a constant pressure of about 25 psi. After propylene oxide addition is complete, the mixture is held at 105° C. until a constant pressure is observed. Residual unreacted monomer is then stripped under vacuum from the polyol product, and the polyol is cooled and recovered. The rate of polymerization is 7.6 g/min. The resulting polyether polyol product has a hydroxyl number of 27.9 mg KOH/g and an unsaturation of 0.017 meq/g.

Following polymerization, the foam-supported catalyst is recovered from the mixture by filtration. The catalyst is washed with acetone and is dried. The recovered catalyst is used to catalyze a second polymerization of propylene oxide as described in this example. The rate of polymerization observed in the second run is 3.4 g/min. The polyether polyol product has a hydroxyl number of 28.3 mg KOH/g and an unsaturation of 0.019 meq/g.

EXAMPLE 11

The procedure of Example 1 is used to prepare a polyurethane foam-supported zinc hexacyanocobaltate catalyst, except that the powdered zinc hexacyanocobaltate catalyst is a substantially amorphous DMC catalyst that is prepared as described below. Tert-butyl alcohol is used as a complexing agent.

Potassium hexacyanocobaltate (8.0 g) is added to deionized water (150 mL) in a beaker, and the mixture is blended with a homogenizer until the solids dissolve. In a second beaker, zinc chloride (20 g) is dissolved in deionized water (30 mL). The aqueous zinc chloride solution is combined with the solution of the cobalt salt using a homogenizer to intimately mix the solutions. Immediately after combining the solutions, a mixture of tert-butyl alcohol (100 mL) and deionized water (100 mL) is added slowly to the suspension of zinc hexacyanocobaltate, and the mixture is homogenized for 10 min. The solids are isolated by centrifugation, and are then homogenized for 10 min. with 250 mL of a 70/30 (v:v) mixture of tert-butyl alcohol and deionized water. The solids are again isolated by centrifugation, and are finally homogenized for 10 min. with 250 mL of tert-butyl alcohol. The catalyst is isolated by centrifugation, and is dried in a vacuum oven at 50° C. and 30 in. (Hg) to constant weight.

Powder X-ray diffraction analysis of the zinc hexacyanocobaltate shows only two signals, both broad, at d-spacings of about 4.82 and 3.76 angstroms, indicating that the catalyst is a substantially amorphous complex.

This powdered zinc hexacyanocobaltate catalyst is formulated into a polyurethane foam as previously described in Example 1. The polyurethane foam-supported catalyst is expected to be useful as an epoxide polymerization catalyst.

EXAMPLE 12

The procedure of Example 1 is used to make a polyurethane foam-supported DMC catalyst, except that the powdered zinc hexacyanocobaltate catalyst includes a polyether polyol as part of the catalyst, and is prepared as follows.

Potassium hexacyanocobaltate (8.0 g) is dissolved in deionized (DI) water (140 mL) in a beaker (Solution 1). Zinc chloride (25 g) is dissolved in DI water (40 mL) in a second beaker (Solution 2). A third beaker contains Solution 3: a mixture of DI water (200 mL), tert-butyl alcohol (2 mL), and polyol (2 g of a 4000 mol. wt. poly(oxypropylene) diol prepared via double metal cyanide catalysis).

Solutions 1 and 2 are mixed together using a homogenizer. Immediately, a 50/50 (by volume) mixture of tert-butyl alcohol and DI water (200 mL total) is added to the zinc hexacyanocobaltate mixture, and the product is homogenized for 10 min.

Solution 3 (the polyol/water/tert-butyl alcohol mixture) is added to the aqueous slurry of zinc hexacyanocobaltate, and the product is stirred magnetically for 3 min. The mixture is filtered under pressure through a 5-µm filter to isolate the solids.

The solid cake is reslurried in tert-butyl alcohol (140 mL), DI water (60 mL), and additional 4000 mol. wt. poly(oxypropylene) diol (2.0 g), and the mixture is homogenized for 10 min. and filtered as described above.

The solid cake is reslurried in tert-butyl alcohol (200 mL) and additional 4000 mol. wt. poly(oxypropylene) diol (1.0 g), is homogenized for 10 min, and is filtered. The resulting solid catalyst is dried under vacuum at 50° C. (30 in. Hg) to constant weight. The yield of dry, powdery catalyst is 10.7 g. Elemental, thermogravimetric, and mass spectral analyses of the solid catalyst show: polyol=21.5 wt. %, tert-butyl alcohol=7.0 wt. %; cobalt=11.5 wt. %.

This powdered zinc hexacyanocobaltate catalyst is formulated into a polyurethane foam as previously described in Example 1. The polyurethane foam-supported DMC catalyst is expected to be useful as an epoxide polymerization catalyst.

EXAMPLE 13

The procedure of Example 1 is used to make a polyurethane foam-supported DMC catalyst of the invention, except that the powdered zinc hexacyanocobaltate catalyst appears substantially crystalline by powder X-ray diffraction analysis, and has a Zn/Co ratio within the range of about 1.5 to 1.8.

Potassium hexacyanocobaltate (8.0 g) is dissolved in deionized (DI) water (150 mL) in a beaker (Solution 1). Zinc chloride (20 g) is dissolved in DI water (30 mL) in a second beaker (Solution 2). A third beaker contains Solution 3: a mixture of tert-butyl alcohol (100 mL) and DI water (300 mL). Solutions 1 and 3 are mixed using a Tekmar high-speed homogenizer with heating until the temperature reaches 50° C. Solution 2 is added slowly, and the mixture is homogenized for 10 min. at 50° C. The catalyst slurry is filtered using a 1.2 μm nylon filter. The solids are reslurried in DI water (100 mL) and tert-butyl alcohol (100 mL), and the mixture is homogenized for 20 min. The slurry is filtered as described above. The washing step with 50% aqueous tert-butyl alcohol is repeated. The solids are reslurried in 100% tert-butyl alcohol (200 mL), and the mixture is again homogenized for 20 min. The solids are again isolated by filtration, and are then dried in a vacuum oven at 50°–60° C. for 4 to 5 hours. A dry zinc hexacyanocobaltate catalyst (8.2 g) having a Zn/Co molar ratio of 1.55 is isolated.

The powdered zinc hexacyanocobaltate catalyst is formulated into a polyurethane foam as previously described in Example 1. The polyurethane foam-supported DMC catalyst is expected to be useful as an epoxide polymerization catalyst.

The preceding examples are meant as illustrations; the scope of the invention is defined by the following claims.

I claim:

1. A process for making an epoxide polymer, said process comprising polymerizing an epoxide in the presence of a polyurethane foam-supported double metal cyanide catalyst.

2. The process of claim 1 wherein the double metal cyanide catalyst is a zinc hexacyanocobaltate.

3. The process of claim 1 wherein the epoxide is selected from the group consisting of ethylene oxide, propylene oxide, butylene oxides, and mixtures thereof.

4. The process of claim 1 wherein the foam-supported double metal cyanide catalyst is recovered from the epoxide polymer and is reused as an epoxide polymerization catalyst.

5. A process for preparing an epoxide polymer, said process comprising polymerizing an epoxide in the presence of a polyurethane foam-supported double metal cyanide catalyst, wherein the foam-supported double metal cyanide catalyst comprises:

(a) a double metal cyanide catalyst; and (b) a polyurethane foam support;

wherein the double metal cyanide catalyst comprises a double metal cyanide compound, an organic complexing agent, and from about 5 to about 80 wt. %, based on the amount of double metal cyanide catalyst, of a polyether.

* * * * *